3,017,416
N-SUCCINIMIDOMETHYL-SUBSTITUTED QUATERNARY AMMONIUM COMPOUNDS

Chien-Pen Lo, Philadelphia, Pa., and Richard L. Orsage, Mount Holly, N.J., assignors to Rohm & Haas Company, Philadelphia, Pa., a corporation of Delaware
No Drawing. Filed Aug. 28, 1959, Ser. No. 836,584
6 Claims. (Cl. 260—326.5)

This invention concerns succinimidomethyl-substituted quaternary ammonium compounds which are fungicidally active and yet have low phytotoxicity toward growing plants. The compounds of this invention have the structure

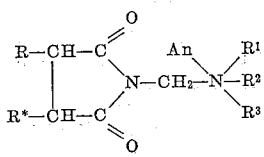

wherein An represents an anion, R and R* represent hydrogen or alkenyl or alkyl groups, $R^1$ represents a lipophilic group of 10 to 25 carbon atoms including alkyl groups of at least 10 carbon atoms and preferably 12 to 20 carbon atoms, alkenyl groups of 11 to 18 carbon atoms and arylaliphatic groups having at least 12 carbon atoms and preferably 15 to 25 carbon atoms including alkyl benzyl groups and alkylphenoxyalkyl and alkylphenoxyalkoxyalkyl groups, and $R^2$ and $R^3$, when taken individually represent alkyl groups of one to two carbon atoms, the β-hydroxyethyl group, or a benzyl group, and, when taken together, form a divalent aliphatic chain of 4 to 5 atoms which with the nitrogen forms a heterocycle as in

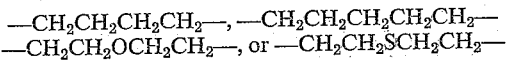

or the corresponding lower alkyl-substituted chains as found in C-methyl-pyrrolidine, piperidine, or morpholine groups.

When a quaternary ammonium compound is prepared from trimethylamine, dimethylbenzylamine, or N-methylmorpholine by reaction with chloromethyl succinimide, the resulting quaternary ammonium compounds are lacking in action against undesirable organisms. Yet, when a lipophilic group is introduced on a nitrogen, the quaternary ammonium compounds become of considerable value against both fungi and bacteria. Furthermore, they have the advantage of being relatively non-phytotoxic to tender plants.

Previously known surface-active quaternary ammonium salts have been used as bactericides for such purposes as sanitizing crockery, glassware, machines and utensils for food handling and manufacture, floors, walls, clothing, etc. In general, these previously known quaternary ammonium compounds have been found to be rather phytotoxic to tender plants. Thus, when young tomato plants in the greenhouse were sprayed with 1% solutions of such compounds as undecyl dimethylbenzylammonium chloride, hexadecyl dimethylbenzylammonium chloride, tert-octylphenoxyethoxyethyldimethylbenzylammonium chloride, and (tert-dodecylmethylbenzyl) trimethylammonium chloride, the plants were killed. Even at concentrations of 0.1%, phytotoxic effects were objectionable in the greenhouse tests.

Yet, a novel group of quaternary ammonium compounds has been discovered which are effective against plant diseases and yet are relatively safely used on plants at the concentrations required to control these diseases.

Quaternary ammonium salts of the above formula can be prepared by reacting an N-halomethyl succinimide and a tert-amine $NR^1R^2R^3$, in which $R^1$ is a lipophilic group. Approximately equivalent quantities of the two reactants are mixed, desirably in an organic solvent. The mixture is heated between 25° and about 150° C. for a time effecting substantially complete reaction. Solvent, if used, is distilled off to leave a residue in the form of an oil, paste, or a solid, which may be used without further purification, if so desired. This residue, however, may be purified by treatment with charcoal or by extraction or in the case of solids by crystallization from a suitable solvent.

As solvents for use in the reaction there may be used acetone, methyl ethyl ketone, methyl hexyl ketone, diethyl ketone, acetonitrile, nitromethane, ethyl acetate, naphtha, benzene, toluene, or xylene.

Typical tertiary amines which may be reacted with succinimidomethyl halide include n-dodecyldimethylamine,
cetyldimethylamine,
decyldiethylamine,
dodecylbenzylmethylamine,
dodecyldibenzylamine,
N-dodecylmorpholine,
N-octadecylmorpholine,
N-dodecylbenzylmorpholine,
N-nonylmethylbenzylmorpholine,
N-myristylpyrrolidine,
N-cetylpipereridine,
oleyldimethylamine,
(5,5,7,7-tetramethyl-2-octenyl)dimethylamine,
octyloxypentenyldimethlamine,
(octylbenzyl)dimethylamine,
dodecylbenzyldimethylamine,
octylphenoxyethoxyethyldimethylamine,
nonylphenoxyethoxyethylbenzylmethylamine,
nonylphenoxyethyldi(hydroxyethyl)amine,
octylphenoxyethoxyethylmorpholine,
nonylphenoxyethoxyethylpiperidine,
or (diethylphenyl-2-pentenyl)dimethylamine.

As halomethyl succinimides, there may be used the N-chloromethyl or N-bromomethyl derivatives of succinimide itself or a mono- or di-substituted succinimide, such as α-methyl-, α,α'-dimethyl-, α-butenyl-, α-butyl-, α-dodecenyl-, or α-dodecylsuccinimide.

Further details of the preparation of the compounds of this invention are given in the following illustrative examples. Parts are by weight unless otherwise designated.

Example 1

A mixture of 12 parts of N-chloromethylsuccinimide, 17.3 parts of dodecyldimethylamine, and 80 parts of acetone was heated under reflux for 2.5 hours. The solid which separated was collected, washed with acetone, and air dried. The product thus obtained amounted to 23 parts and melts at 171–173° C. with decomposition. This is dodecyldimethyl (succinimidomethyl) ammonium chloride and has the structure of

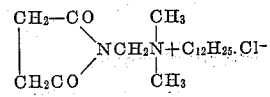

*Analysis.*—Calculated for $C_{19}H_{37}ClN_2O_2$: Cl, 9.9; N, 7.8. Found: Cl, 9.7; N, 7.4.

In slide germination tests this compound gave $ED_{50}$ values of 1–10 p.p.m. against *Alternaria solani* and *Stemphylium sarcinaeforme* and of 10–50 p.p.m. against *Monolinia fructicola*.

In the same way, there are reacted N-octadecylmorpholine (27 parts) in the place of the above dodecyldimethylamine. The product is obtained as a paste and corresponds in composition to octadecyl(succinimidomethyl)morpholinium chloride. It gives $ED_{50}$ values of 10–50 against the standard test organisms. It is not phytotoxic at 1% or 0.1% to young tomato or Lima bean plants.

Example 2

A mixture of 12 parts of N-chloromethylsuccinimide, 17.2 parts of dimethyl-(5,5,7,7-tetramethyl-2-octenyl)-amine, and 80 parts of acetone was heated under reflux for two hours. The product was isolated in the usual manner. There was obtained 24 parts of dimethyl(succinimidomethyl) - 5,5,7,7 - tetramethyl - 2-octenylammonium chloride having the structure

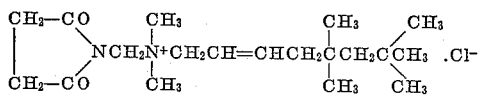

a white solid which melts at 188°–190° C. with decomposition.

*Analysis.*—Calculated for $C_{19}H_{37}ClN_2O_2$: Cl, 9.9; N, 7.8. Found: Cl, 9.7; N, 7.6.

Against *Monolinia fructicola* this compound gave an $ED_{50}$ value of one p.p.m. It was not phytotoxic at 1% or 0.1% to Lima bean plants.

Example 3

A mixture of 14.8 parts of N-chloromethylsuccinimide, 30.3 parts of (dodecylbenzyl)dimethylamine, and 80 parts of acetone was heated under reflux for one hour. The product was isolated in the usual manner as a solid (35.2 parts) which melts at 193°–194° C. with decomposition. This is (dodecylbenzyl)dimethyl(succinimidomethyl)ammonium chloride having the structure

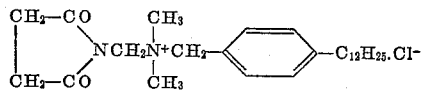

*Analysis.*—Calculated for $C_{26}H_{43}ClN_2O_2$: Cl, 7.9; N, 6.2. Found: Cl, 8.3; N, 6.2.

In slide germination tests, this compound gave $ED_{50}$ values of 1–10 p.p.m. against *Alternaria solani, Monolinia fructicola,* and *Stemphylium sarcinaeforme.*

On tender young tomato plants it showed slight injury at 1% and no injury at 0.1%. On Lima bean plants it showed no injury even at 1%.

In the same way there may be reacted as above 31.5 parts of N-dodecylbenzylpyrrolidine in the place of the above dedecylbenzyldimethylamine to give dodecylbenzyl(succinimidomethyl)pyrrolidinium chloride, which has $ED_{50}$ values of about 10 p.p.m. against the standard test organisms and is not phytotoxic at 1% or 0.1% against young tomato and Lima bean plants.

N-dodecylbenzylpiperidine reacts in the same way to give dodecylbenzyl(succinimidomethyl)piperidinium chloride which gives $ED_{50}$ values also of about 10 p.p.m. and is non-phytotoxic in the tests against young tomato and Lima bean plants.

Example 4

A mixture of 14.8 parts of N-chloromethylsuccinimide, 32.2 parts of tert-octylphenoxyethoxyethyldimethylamine, and 160 parts of acetone was heated under reflux for three hours. The solid which separated upon cooling was collected and dried. There was obtained 38.1 parts of dimethyl-(tert-octylphenoxyethoxyethyl)succinimidomethylammonium chloride which melts at 154°–157° C. with decomposition.

This has the structure

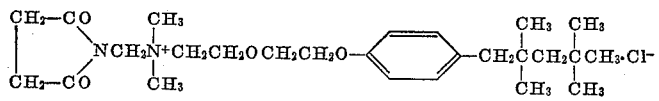

*Analysis.*—Calcd. for $C_{25}H_{41}ClN_2O_4$: Cl, 7.6; N. 6.0. Found: Cl, 7.6; N, 5.7.

In the slide-germination test, this compound gave the following $ED_{50}$ values: 1–10 p.p.m. against both *Alternaria solani* and *Stemphylium sarcinaeforme,* and 10–50 p.p.m. against *Monolinia fructicola.*

On Lima bean plants, it showed no injury even at 1%.

Example 5

(a) (N-chloromethyl)dodecenylsuccinimide was prepared as follows:

A mixture of 106 parts of dodecenylsuccinimide, 36 parts (37%) formaldehyde, and 200 parts of dioxane was refluxed for three hours. The mixture was concentrated under reduced pressure. 260 parts of benzene were added to the residue and the water in the mixture was removed by azeotropic distillation. The dry benzene solution was then evaporated in vacuo to give 108 parts of a viscous oil which was the (N-hydroxymethyl)dodecenylsuccinimide.

The crude (N-hydroxymethyl)dodecenylsuccinimide (58 parts) was dissolved in chloroform (180 parts) and treated with thionyl chloride (28.7 parts). The mixture was stirred at room temperature for 1.5 hours and then heated under reflux for 30 minutes. The mixture was concentrated in vacuo to give 51 parts of a thick oil. Distillation of this material yielded 31.5 parts of pure (N - chloromethyl)dodecenylsuccinimide, which boiled at 151°–173° C. (0.2 mm.) and had $n_D^{25}$ 1.4962.

*Analysis.*—Calcd. for $C_{17}H_{28}ClNO_2$: N, 4.4. Found: N, 4.2.

(b) A mixture of (N-chloromethyl)dedecenylsuccinimide (13.5 parts), 5.8 parts of benzyldimethylamine and 60 parts of acetone was heated under reflux for two hours. The solid which separated upon cooling was collected and dried. There was obtained 5.3 parts of benzyl(dodecenylsuccinimidomethyl)dimethylammonium chloride,

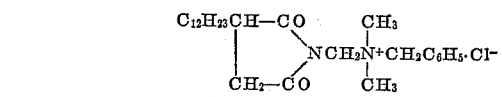

which melted at 161°–163° C.

*Analysis.*—Calcd. for $C_{26}H_{41}ClN_2O_2$: Cl, 7.9; N, 6.3. Found; Cl, 7.7; N, 6.1.

This compound in the standard slide-germination tests gave $ED_{50}$ values against *Monolinia fructicola* of 10–50 p.p.m., against *Alternaria solani* of 1–10 p.p.m. and against *Stemphylium sarcinaeforme* of less than one p.p.m.

It was not phytotoxic to young tomato plants or Lima beans at 1% or 0.1%.

Example 6

A mixture of 15 parts of (N-chloromethyl)dodecenylsuccinimide, 14.5 parts of (dodecylbenzyl)dimethylamine, and 80 parts of acetone was heated under reflux for 4.5 hours. The mixture was stripped to give 25 parts of a viscous oil. This has the structure of

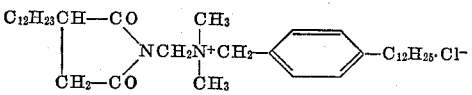

which was identified as (dodecenylsuccinimidomethyl)(dodecylbenzyl)dimethylammonium chloride.

*Analysis.*—Calcd. for $C_{38}H_{65}ClN_2O_2$: Cl, 5.8; N, 4.6. Found: Cl, 5.1; N, 4.2.

In the slide-germination test, this compound gave the following $ED_{50}$ values: 1–10 p.p.m. against *Monolina fructicola* and 10–50 p.p.m. against both *Alternaria solani* and *Stemphylium sarcinaeforme.*

Repetition of the above procedure with substitution of an equivalent weight of N-chloromethyldodecylsuccinimide gave the corresponding dodecylsuccinimidomethyl(dodecylbenzyl)dimethylammonium chloride. It has an ED₅₀ value of about 1–10 p.p.m. against the three test organisms named above.

On tomato and Lima bean plants, it showed no injury even at 1%.

Example 7

(a) (N-chloromethyl-α,α′-dimethylsuccinimide was prepared as follows:

A mixture of 15 parts of α,α′-dimethylsuccinimide, 11 parts (37%) of formaldehyde, and 10 parts of water was refluxed for two hours. The mixture was concentrated under reduced pressure to about half of its volume and benzene (50 parts) was added. The remaining water was removed by azeotropic distillation. The dry benzene solution was then evaporated in vacuo to give 15.8 parts of a solid melting at 45°–50° C. This was the (N-hydroxymethyl)-α,α′-dimethylsuccinimide.

The above crude (N-hydroxymethyl)-α,α′-dimethylsuccinimide was dissolved in 30 parts of chloroform and treated with 11.9 parts of thionyl chloride. The mixture was heated under reflux for two hours and then concentrated in vacuo to yield 16.4 parts of a viscous oil which was the (N-chloromethyl)-α,α′-dimethylsuccinimide.

*Analysis.*—Calcd. for $C_7H_{10}ClNO_2$: N, 8.0. Found: N, 8.0.

(b) A mixture of 8 parts of N-chloromethyl-(α,α′-dimethyl)succinimide, 14.4 parts (96.4%) of (dodecylbenzyl)dimethylamine and 40 parts of acetone was heated under reflux for three hours. The acetone was then removed by evaporation under reduced pressure. The residual oil was dissolved in ethanol to yield 64.7 parts of a solution which was found by AgNO₃ titration to contain 24% of (dodecylbenzyl)dimethyl-(α,α′-dimethylsuccinimidomethyl)ammonium chloride having the structure

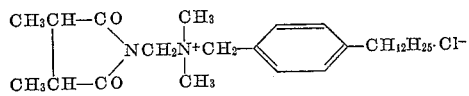

This compound gave ED₅₀ values of 1–10 p.p.m. against *Alternaria solani* and *Monolinia fructicola* and less than one p.p.m. against *Stemphylium sarcinaeforme*.

There was also prepared for the purpose of comparison benzylidimethyl(succinimidomethyl)ammonium chloride. First, N-chloromethylsuccinimide was formed by reacting N-hydroxymethylsuccinimide and phosphorus trichloride according to the method of Cherbuliez and Sulzer, Helv. chim. Acta 8, 567 (1925). Then 14.8 parts of this product, 13.5 parts of benzyldimethylamine, and 80 parts of acetone were heated at refluxing temperatures for four hours. The mixture was cooled in an ice bath. Solid formed and was separated, washed with acetone, and dried in air. The yield was 21.3 parts of benzyldimethyl(succinimidomethyl)ammonium chloride, melting at 190°–191.5° C. with decomposition. It gave ED₅₀ values against the standard test organisms greater than 1000 p.p.m.

Example 8

There are mixed 31.4 parts of (N-chloromethyl)dodecenylsuccinimide, 10.1 parts of N-methylmorpholine and 80 parts of acetone. The mixture is heated for four hours at reflux temperatures. The reaction mixture is then stripped of solvent by heating to leave a residue of 40 parts of a viscous oil. By analysis this oil corresponds to (dodecenylsuccinimidomethyl)methylmorpholinium chloride.

The preparation is repeated with substitution of 32 parts of (N-chloromethyl)dodecylsuccinimide for the above dodecenyl compound. The product is (dodecylsuccinimidomethyl)methylmorpholinium chloride obtained as an oil.

These compounds gave ED₅₀ values of 10–50 p.p.m. against the three standard test organisms. Neither compound is phytotoxic at 1% to young tomato plants.

These compounds are of significance in establishing that the hydrophobic group may be attached not to the nitrogen but at another position in the molecule to give essentially equivalent results.

The compounds of this invention have been examined for bactericidal action and all were found thus active in varying degree. The chief value, however, of these compounds is in controlling fungi.

While in the examples there has been used the chloromethyl group, there may be used in the identical way the bromomethyl group. The resulting quaternary ammonium bromides are at least as effective as the corresponding chlorides and in some instances are more active.

As is known in the art, the chloride or bromide ion may be replaced in known ways with other anions. Thus, a concentrated solution of a quaternary ammonium chloride may be treated with a sodium phosphate solution to exchange anions with formation of quaternary ammonium phosphate. Through conversion of halide to hydroxide and subsequent neutralization any anion can be introduced, including acetate or propionate, as typical anions of organic acids. It is thus possible to have present any desired anion.

We claim:

1. Compounds of the formula

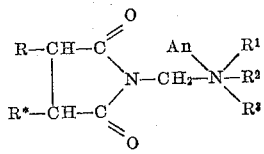

wherein An represents an anion, R and R* represent a member of the class consisting of hydrogen, alkyl of one to 12 carbon atoms, and alkenyl groups, R¹ represents a lipophilic group of 10 to 25 carbon atoms, and R² and R³ when taken individually represent groups from the class consisting of alkyl groups of one to two carbon atoms, and 2-hydroxyethyl group, and the benzyl group and when taken together form a divalent chain from the class consisting of —CH₂CH₂CH₂CH₂—, —CH₂CH₂CH₂CH₂CH₂—, and CH₂CH₂OCH₂CH₂— and these chains having a methyl substituent.

2. Dodecyldimethyl(succinimidomethyl)ammonium chloride.

3. Dodecylbenzyldimethyl(succinimidomethyl)ammonium chloride.

4. Dodecylbenzyldimethyl(α-methylsuccinimidomethyl)ammonium chloride.

5. Dimethyl(tert-octylphenoxyethoxyethyl)succinimidomethyl)ammonium chloride.

6. Dodecylbenzyldimethyl(α-dodecenylsuccinimidomethyl)ammonium chloride.

References Cited in the file of this patent

UNITED STATES PATENTS 2,271,122    Harman _____ Jan. 27, 1942

OTHER REFERENCES

Hellman et al.: "Chem. Ber.," vol. 87, pages 1684–1690 (1954).